J. B. STONER.
Floating Light-Houses.
No. 138,293.
2 Sheets--Sheet 2.
Patented April 29, 1873.
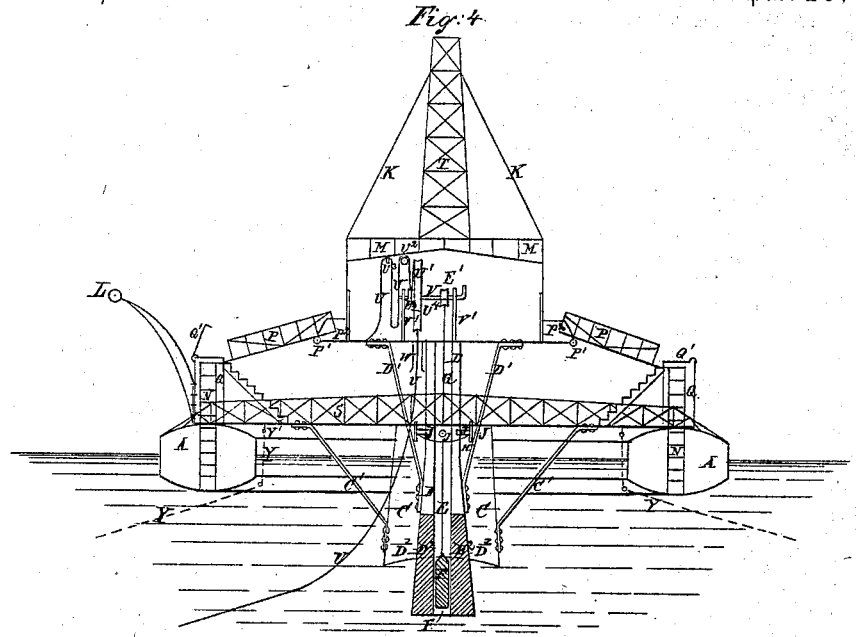
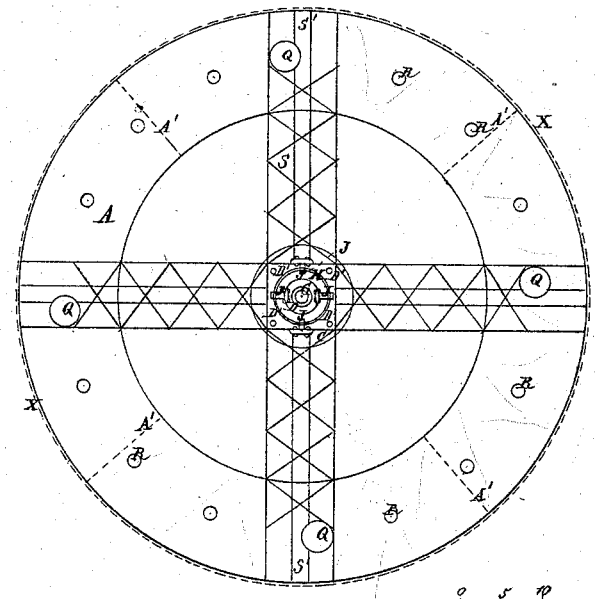
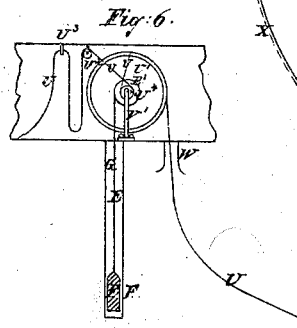
Witnesses:
Inventor:

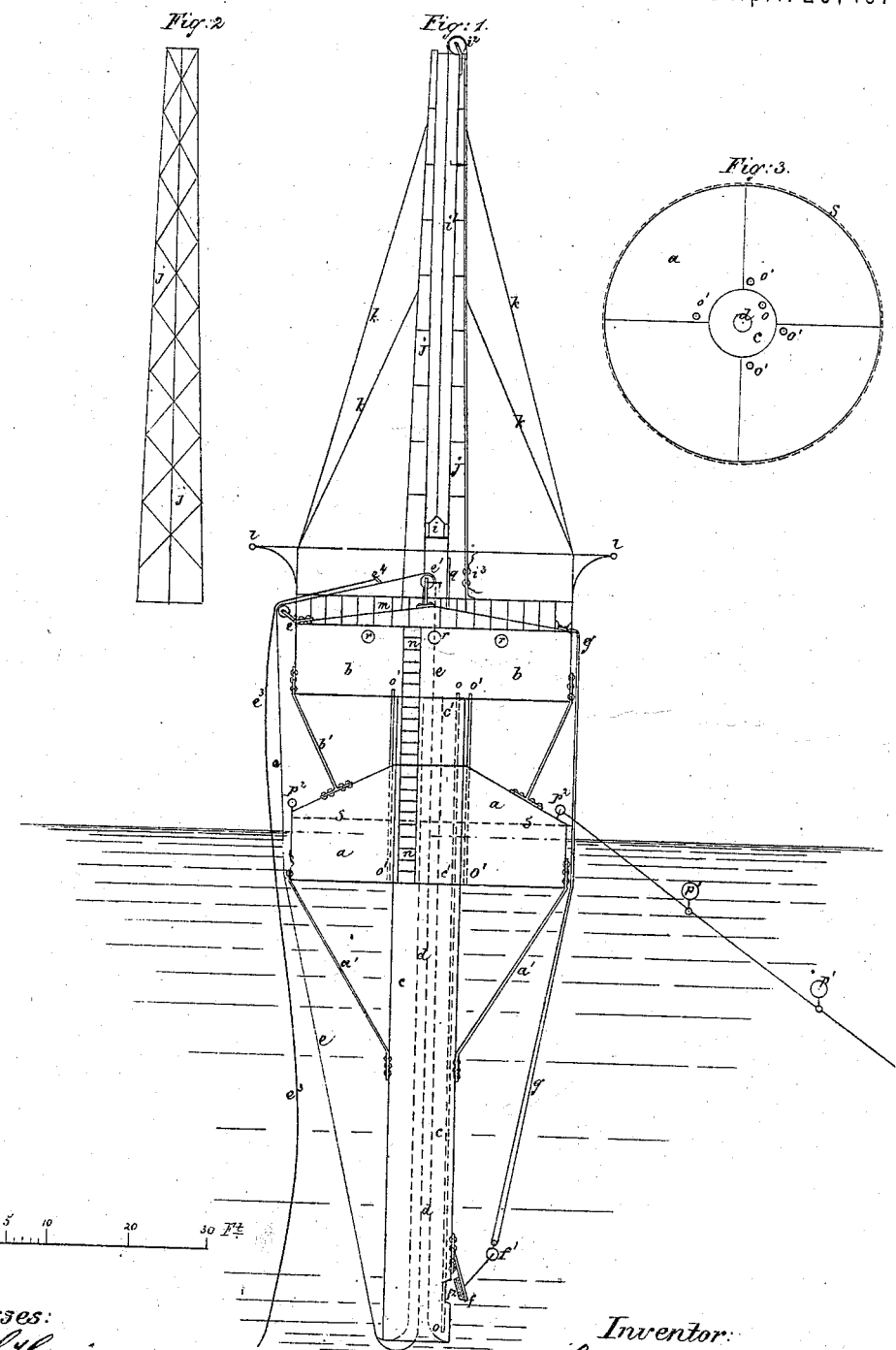

UNITED STATES PATENT OFFICE.

JOHN B. STONER, OF NEW YORK, N. Y.

IMPROVEMENT IN FLOATING LIGHT-HOUSES.

Specification forming part of Letters Patent No. 138,293, dated April 29, 1873; application filed March 22, 1872.

*To all whom it may concern:*

Be it known that I, JOHN B. STONER, of New York, in the county of New York, in the State of New York, have invented a new or Improved Floating Light-House and Telegraph and Life-Boat Station; and I do hereby declare that the following is a full and exact description thereof, reference being had to the accompanying drawing, and to the letters of reference marked thereon, making a part of this specification.

The nature of my invention consists of an improved floating structure intended to be used at sea for the purpose of a light-house, telegraph-station, life-boat station, floating refuge for saving life from wrecks, or for other similar or analogous purposes. It may be anchored in any depth of water, and is constructed and fitted in the manner hereinafter described.

For deep water, in its general form, the structure comprises a buoy or float, carrying an elevated light-house surmounted by a signal shaft or column, at the top of which revolving lights or other signals may be fitted. I form the float or buoy with an inner and outer cylinder, the latter varying from ten to fifty feet in diameter, rising from three to five feet above the water-line, and dipping from five to fifteen feet below the water-line, the former or inner cylinder being from three to eight feet in diameter, and rising to the floor of the light-house above, or from fifteen to twenty feet above the water-line, and dipping from twenty to one hundred feet (more or less) below the water-line, having a center tube or pipe running through its entire length, open at top and bottom, the space between them being filled with water. The outer cylinder or float is made in four sections, each distinct from the other, and respectively water-tight. The space between the outer and inner cylinder is closed at the top by a flat cone or dome, and at the bottom by an inverted cone with plane, concave, or convex sides. To this portion of the structure are fitted several ladders for enabling persons in the water to support themselves, or to ascend to the roof of the float or buoy, and thence up into the light-house above, which includes telegraph and other offices and apartments, and is hereinafter called the office. The office is supported from the top of the buoy or float partly by means of the inner cylinder, and partly by light iron columns and stays, and is divided into compartments, furnished and fitted as may be required. It is covered at the top by a flat roof or deck, ingress thereto and egress therefrom being had through an opening in the center of the roof by means of a ladder or stairs therefrom to the floor below. The center tube in the inner cylinder is provided for establishing a connection between the office and the water at the bottom of the inner cylinder, and for the purpose of passing the telegraph-cable to the office. This inner cylinder, when filled with water, gives the necessary vertical stability, or acts as ballast to the structure. It is fitted with a valve and force-pump at the bottom, so that the water can be pumped out when required.

For use in channels and shallow waters generally, I dispense with the inner and outer cylinders before mentioned, using, instead thereof, a skeleton frame-work under water for carrying the requisite ballast, the length of which frame is regulated according to the depth of water where it is to be anchored. In this case I form the buoy or float in the shape of a hollow ring, varying from fifty to one hundred feet in diameter, the tube of which may be from three to twelve feet wide by from two to eight feet in depth, it being understood that all these dimensions may be considerably exceeded, or even diminished, according to circumstances. The diameter and buoyancy of this float will be determined by the height and other requirements of the station. This circular float is bridged across by a strong skeleton frame-work, to the center of which the framing for the ballast is securely attached by a universal joint, or by the well-known gimbal arrangement. To the upper portion of this framing strong posts or stays are fixed for the purpose of supporting the office above. By this arrangement the motion given to the float by the waves but slightly affects the steadiness of the structure above.

In order to protect the slack of the telegraph-cable under water from being destroyed or damaged by the ebb and flow of tides, the set of streams, or the force of winds acting upon and drifting or shifting the structure, I fix a wheel inside the telegraph-office of from six to twelve feet diameter. On the shaft which carries this wheel I attach a drum or wheel of from two to four feet in diameter; also, on the same shaft I fix a small wheel or pulley of twelve to fifteen inches diameter, more or less. After passing the free end of the cable through the tube to the office I attach the said cable at about fifty feet from its end to the rim of the large wheel; thence it is carried to and passed once around the small wheel or pulley. It is then passed over a pulley fixed to the ceiling or upper part of the office. After allowing about fifteen feet of slack the cable is securely fixed to the ceiling. From this latter fixed point the cable is carried to the telegraph-desk, or wherever it may be required. On the periphery of the middle-sized drum or wheel, before described, I fix one end of a rope or chain, varying in length according to circumstances, and to the other end thereof a weight is attached. The object of this arrangement is that the said weight at the end of the chain, operating upon the wheel in the opposite direction to the strain of the cable thereon, shall keep an equal strain upon the cable, and thus prevent the accumulation of slack at the bottom of the water, and thus avoid injury to the cable through kinking or chafing on the hard surface at the bottom of the water.

The object of the arrangement of the small pulley on the wheel-shaft, and the pulley fixed to the ceiling of the office, and the firmly securing of the cable to the ceiling, is that the slack cable between the said pulley and the point where it is firmly secured may be sufficient to meet the motion of the wheel, and thus secure the end attached to said desk from any motion or strain.

In order that my said improvements may be more clearly and fully understood, and be more readily carried out in practice, I now proceed more particularly to describe the same, with the aid of the accompanying drawing, reference being made thereto by the letters and figures marked thereon, which reference applies to each figure where the same index letters appear.

Description of the Drawing.

Figure 1, Sheet 1, is an elevation of my improved station as arranged for deep water. Fig. 2, Sheet 1, is a vertical section of the upright framing for carrying the light or other signal. Fig. 3, Sheet 1, is a horizontal section of the buoy taken at the water-line. Fig. 4, Sheet 2, is a vertical section of the station as adapted for shallow waters. Fig. 5, Sheet 2, is a horizontal-plan view of the buoy for the same. Fig. 6, Sheet 2, is a side view of the apparatus for taking up the slack of the telegraph-cable.

In Figs. 1, 2, and 3, Sheet 1, $a$ shows the buoy or outer cylinder. $a'$ are four braces, which support and stay the inner cylinder $c$ from the outer edge of the buoy $a$. $b$ is the office. $b'$ are four braces, which support and stay the office $b$ from the top of the buoy or float $a$. $c$ is the lower portion of the inner cylinder, made water-tight, and is fitted with a valve, $f$, at its lower end, for filling it with water, when it raises the structure to a vertical position, and acts as ballast to steady the same. It is provided with a force-pump and pipe, $o$, for the purpose of pumping out the water, when the said cylinder acts as an additional float, and gradually lays the structure upon the water, when the whole or any portion thereof can be painted, repaired, or renewed, or the whole can be removed to another position. This inner chamber is provided with a partition at the level of the bottom of the buoy or float $a$, to prevent the water rising above that level within the said cylinder, thus keeping the upper portion of the said cylinder $c'$ free from water, and thereby becoming a part of the buoy or float. Through this part $c'$ ingress and egress is had between the office and the interior of the buoy $a$, which is intended to be used for stowing coals and general stores. $d$ is the center tube or pipe, through which the telegraph-cable $e^3$ is passed to the office by means of the endless chain or wire-rope $e$, operated by the windlass $e^1$. $e^2$ is a pulley for passing the said endless chain over the office-roof, and keeping it clear of the structure, as shown. $e^4$ shows a link fixed to the endless chain $e$. To this link the telegraph-cable is temporarily attached when it is required to bring the same into the office, or vice versa. $f^1$ is a weight attached to the valve $f$, so as to hold the said valve securely in its recess $f^2$ when closed. $g$ is a rope by which the valve $f$ is held open while the cylinder $c$ is filling with water. $h$ is a belaying-pin, to which the ends of the rope $g$ are secured. $i$ is the lantern, raised to the top of the upright framing $j$ by the rope $i^1$, which latter passes over the pulley $i^2$ at the top of the said framing, and is secured to the cleat $i^3$. $k$ are guy or stay ropes for supporting and steadying the lantern-framing $j$. $l$ are davits for swinging life-boats. $m$ shows the iron railing around the roof of the office. $n$ is a ladder, fixed to the outside of the structure, leading from the surface of the water to the roof of the office. $o^1$ are tubes or pipes, through which the water is pumped out of the several compartments of the buoy $a$, in case of leakage. $p$ are mooring-chains, formed of iron rods in long lengths, and attached by the ring $p^2$ to the buoy $a$. $p^1$ are water-tight buoys, one to each link of the said mooring-chain, with floating capacity nearly sufficient to float one of the said lengths of rod, thus taking the weight and strain of the said mooring-chains from the main buoy $a$. $q$ shows a side view of a door opening into the office. $r$ shows the dead-lights for lighting the office; and $s$ is the chain fixed around the outside of the buoy $a$, for persons in the water to hold on by until rescued.

In Figs. 4, 5, and 6, Sheet 2, A shows the main circular buoy divided into four watertight compartments by the partitions A'. This buoy is also intended to be the general store-room. B is the office. C shows a hollow frustum of a cone, attached to the bridge S, and secured and stayed by the braces C'. This conical casing is for the purpose of protecting the ballast $D^2$ against currents. D is a tube splayed out toward its bottom end, passing from the office which is built upon it downward for a length regulated by the depth of water, and containing the ballast $D^2$. $D^1$ are strong iron braces, which support and stay the office B from the splayed tube D. H is a ring surrounding the tube D. J shows four journals, the ends of two or a pair of which are firmly fixed to the metal bearing H', which are firmly attached to the bottom of the bridge S outside the ring H, and the ends of the other two journals are firmly fixed to the tube D inside the ring H. The opposite ends of these four journals pass through the ring H, thus forming the well-known gimbal arrangement, for the purpose, with the aid of the ballast $D^2$, of keeping the office always in a horizontal position. K are stays for supporting the framing T. L are four davits for swinging boats on. M shows the railing around the roof of the office. N is a ladder passing through the tube Q into the buoy A. O are stairs leading from the bridge S to the top of the tube Q. P are bridges between the tops of the tubes Q and the platform $P^2$. These bridges are jointed at one end to the tubes Q, their other ends being free to move on the rollers P', in obedience to the motion of the buoy A. Q' are hatches or covers to the tubes Q. R are the dead-lights on the upper part of the buoy A. S are two bridges forming a cross on the buoy A, as shown. T is the upright framing for carrying the signals. U is the telegraph-cable, passed three or more times around the skeleton-wheel $U^1$, and then firmly secured to the edge of the rim of the said wheel. It then passes over a small drum, $U^4$, and thence over a traveler, $U^2$, attached to the ceiling of the office. Here some fifteen feet of slack cable is allowed to hang free, when the said cable is firmly secured to the ceiling of the office, near the traveler $U^2$—say at $U^3$—leaving the end of the cable free to be carried to the battery, or be otherwise disposed of, as may be required. The object of this arrangement or apparatus is to take up the slack of the cable, and thus prevent its forming a coil and kinking at the bottom of the water, or chafing on the hard bottom, and at the same time to avoid all strain or motion in that portion of the cable between $U^3$ and the battery.

The action of this apparatus is as follows. (See Fig. 6, Sheet 2.) The wheel $U^1$ is, say, twenty-seven feet in circumference; hence three coils of cable around it will measure eighty-one feet. The length of the tube is, say, twenty-two feet, and that of the weight F four feet, (this weight is suspended from the drum or wheel E' by the chain or rope E,) thus leaving the play of the said weight F in the tube G at eighteen feet. The drum E' has a circumference of six feet; therefore, while the wheel $U^1$, by the flow of the tide, the drifting of the buoy, &c., makes three revolutions, and gives out the eighty-one feet of cable wound upon it, the drum E' makes the same number of revolutions, and thereby winds up the weight F eighteen feet, which is much more than can be required for the rise and fall of any known tide, the weight F being so regulated to the strain of the cable as to have an advantage of at least twenty pounds over the strain of the cable on the rim of the wheel $U^1$ at high tide, to insure the winding up of the slack of the said cable as the tide ebbs, or when the structure drifts toward the cable. Also, as the drum $U^4$ is only three feet in circumference, and performs only three revolutions, it will only take up nine feet of the said fifteen feet of slack cable hanging free between $U^2$ and $U^3$, thereby preventing all interference with the cable beyond $U^3$.

V is the shaft on which the wheels E' and $U^1$ and the drum $U^4$ are fixed; and V' are the posts or bearings on which the shaft V works. W is a short tube fixed in the floor of the office, for the telegraph-cable to pass through. X is a chain fixed around the buoy A. Y shows the mooring-chains, which are joined to the bridge S by the rings Y'.

Having thus fully described the nature of my invention, and the manner of operating the same, without binding myself to the exact forms or the dimensions specified therein, or shown in the drawing, what I claim as new, and desire to secure by Letters Patent, is—

1. The wheel $U^1$ and wheel E', the latter having a weight suspended from it, in combination with suspenders $U^2$ $U^3$, and the telegraph-cable U, substantially as and for the purpose described.

2. The tubes $d$ $c$, extending from the office below the water-line, and provided with a valve, $f$, and a pump-tube, $o$, substantially as described.

3. The elevated office and an external buoy, A, connected together by means of a gimbal-joint, and having combined with them a loaded tubular portion which extends down into the water and keeps the said office in an upright position, substantially as described.

4. The casing C in combination with the ballast $D^2$, substantially as and for the purpose described.

JOHN B. STONER.

Witnesses:
W. L. HAINES,
ADRIAN M. CROMMELIN.